(12) United States Patent
Liu et al.

(10) Patent No.: US 9,076,582 B2
(45) Date of Patent: Jul. 7, 2015

(54) MAGNETIC COMPONENT AND BOBBIN THEREOF

(75) Inventors: Chia-Ming Liu, Taoyuan Hsien (TW);
Ming-Cheng Lee, Taoyuan Hsien (TW);
Yi-Lin Chen, Taoyuan Hsien (TW);
Po-Yu Wei, Taoyuan Hsien (TW);
Chih-Ming Chen, Taoyuan Hsien (TW);
Cheng-En Liao, Taoyuan Hsien (TW);
Wei-Chin Chen, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 0 days.

(21) Appl. No.: 13/612,880

(22) Filed: Sep. 13, 2012

(65) Prior Publication Data
US 2013/0249665 A1 Sep. 26, 2013

(30) Foreign Application Priority Data
Mar. 21, 2012 (TW) .............................. 101109580 A

(51) Int. Cl.
*H01F 27/30* (2006.01)
*H01F 5/04* (2006.01)
*H01F 5/02* (2006.01)

(52) U.S. Cl.
CPC ............... *H01F 5/04* (2013.01); *B60L 2200/26* (2013.01); *H01F 5/02* (2013.01)

(58) Field of Classification Search
CPC . H01H 50/443; H01H 50/042; H01R 43/055; H01R 13/02; H01F 27/30; H01F 27/325
USPC ............. 336/196, 197, 198, 208; 335/121, 83
See application file for complete search history.

(56) References Cited

U.S. PATENT DOCUMENTS

| | | | | |
|---|---|---|---|---|
| 3,213,397 | A * | 10/1965 | Broverman | 336/60 |
| 4,389,021 | A * | 6/1983 | Coldren | 439/545 |
| 4,626,813 | A * | 12/1986 | Koga et al. | 335/278 |
| 5,153,550 | A * | 10/1992 | Sugiura et al. | 336/192 |
| 5,200,731 | A * | 4/1993 | Tochio et al. | 336/98 |
| 5,253,550 | A * | 10/1993 | Sonoda | 477/138 |
| 5,541,461 | A * | 7/1996 | Joseph | 310/71 |
| 7,289,012 | B2 * | 10/2007 | Tran-Ngoc et al. | 336/90 |
| 8,421,572 | B2 * | 4/2013 | Cheng et al. | 336/198 |
| 2011/0115594 | A1 | 5/2011 | Yen | |

FOREIGN PATENT DOCUMENTS

| | | |
|---|---|---|
| CN | 201655484 U | 11/2010 |
| CN | 201681707 U | 12/2010 |
| JP | 63283005 A * | 11/1988 |
| JP | 1-133718 | 9/1989 |
| JP | H09180945 A | 7/1997 |
| JP | 2003-158020 | 5/2003 |
| JP | 2006-278792 | 10/2006 |

* cited by examiner

*Primary Examiner* — Alexander Talpalatski
*Assistant Examiner* — Joselito Baisa
(74) *Attorney, Agent, or Firm* — CKC & Partners Co., Ltd.

(57) ABSTRACT

A bobbin can be used for a magnetic component. The magnetic component includes at least one coil, and the coil includes at least one pin. The bobbin includes a body and a pin holder. The body includes a winding part and two plates. The winding part is used for winding the coil. The plates are respectively disposed on the opposites of the winding part. The pin holder is disposed on one of the plates, and it includes at least one locating hole for inserting the pin.

8 Claims, 5 Drawing Sheets

MAGNETIC COMPONENT AND BOBBIN THEREOF

RELATED APPLICATIONS

This application claims priority to Taiwan Application Serial Number 101109580, filed Mar. 21, 2012, which is herein incorporated by reference.

BACKGROUND

1. Technical Field

Embodiments of the present disclosure generally relates to a magnetic component and the bobbin thereof. More particularly, embodiments of the present disclosure relates to a magnetic component having a bobbin with a pin holder.

2. Description of Related Art

In modern life, there are a wide variety of electric devices flooding over the world. In those devices, a transformer is indispensable for adjusting voltage in order to keep the devices functioning.

Generally, the transformer mainly includes a bobbin, cores, a primary coil and a secondary coil. The primary coil and the secondary coil are winded on the winding part of the bobbin. When providing an input voltage to the primary coil, electromagnetic induction will occur in the cores, and an output voltage will be accordingly generated in the secondary coil. The output voltage and the input voltage can be varied by controlling the differences between the turns of the primary coil and the secondary coil, thereby to achieve the effect of voltage transformation.

In a conventional bobbin, a plurality of legs are formed on the bottom surface thereof, such that pins of the primary coil and the secondary coil can be winded on or welded on these legs. However, winding or welding pins of the primary coil and the secondary coil on the legs always waste time and are not convenient. Further, in case of employing copper foils as pins of the primary coil and the secondary coil, the foil-shaped structure will make the process of winding or welding pins more difficult. Therefore, fastening the pins is not an easy work in the related art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with one embodiment of the present disclosure, a bobbin applicable to a magnetic component is provided, in which the magnetic component includes at least one coil having at least one pin. The bobbin includes a body and a pin holder. The body includes a winding part and two plates. The winding part is used for winding the coil. The plates are respectively disposed at opposite ends of the winding part. The pin holder is disposed on one of the plates, and it includes at least one locating hole for inserting the pin.

In accordance with another embodiment of the present disclosure, a magnetic component includes a coil, a bobbin, and at least one core. The coil has at least one pin. The bobbin includes a body and a pin holder. The body includes a winding part, two plates, and a through passage. The coil is winded on the winding part. The plates are respectively disposed at opposite ends of the winding part. The pin holder is disposed on one of the plates, and it includes at least one locating hole, in which the pin inserts in the locating hole. The core partially inserts in the through passage.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
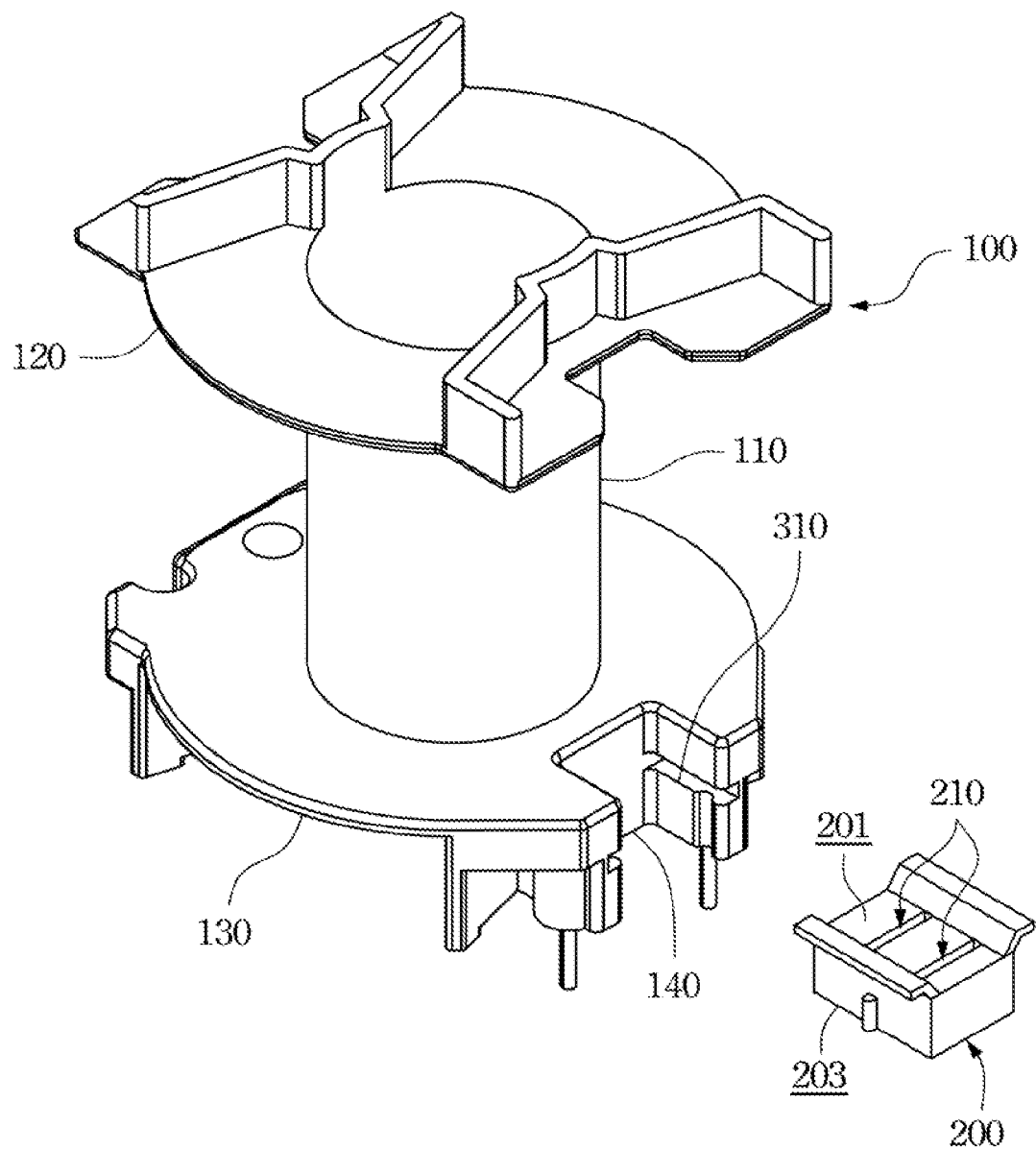
FIG. 1 is a perspective view of a bobbin in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a perspective view of a bobbin in accordance with one embodiment of the present disclosure. The bobbin is applicable to a magnetic component. As shown in this figure, the bobbin includes a body 100 and a pin holder 200. The body 100 includes a winding part 110 and two plates 120 and 130. The plates 120 and 130 are respectively disposed at opposite ends of the winding part 110. The pin holder 200 is disposed on one of the plates (i.e. the plate 130 in this embodiment), and it includes at least one locating hole 210 for inserting the pin (not shown in this figure) of the coil of the magnetic component within.

Through aforementioned configuration, the embodiment of the present disclosure employs the pin holder 200 disposed on the plate 130, and further provides the locating hole 210 on the pin holder 200, so that the pin of the coil of the magnetic component can be inserted in the locating hole 210, thereby omitting the difficulties derived from winding or welding the pin in the related art.

In some embodiments, the pin holder 200 includes an upper surface 201 and a lower surface 203, and the upper surface 201 and the lower surface 203 are opposite to each other. The locating hole 210 penetrates through the upper surface 201 and the lower surface 203, so that the pin of the coil (not shown in this figure) can stretch out of the lower surface 203. In this embodiment, the pin holder 200 is detachably disposed on the plate 130. For example, the plate 130 disposed with the pin holder 200 further includes a containing cavity 140, and part of the pin holder 200 is contained in the containing cavity 140. Specifically, at least a part of the pin holder 200 is inserted into the containing cavity 140 so as to fasten the pin holder 200 on the plate 130.

Figure 2:
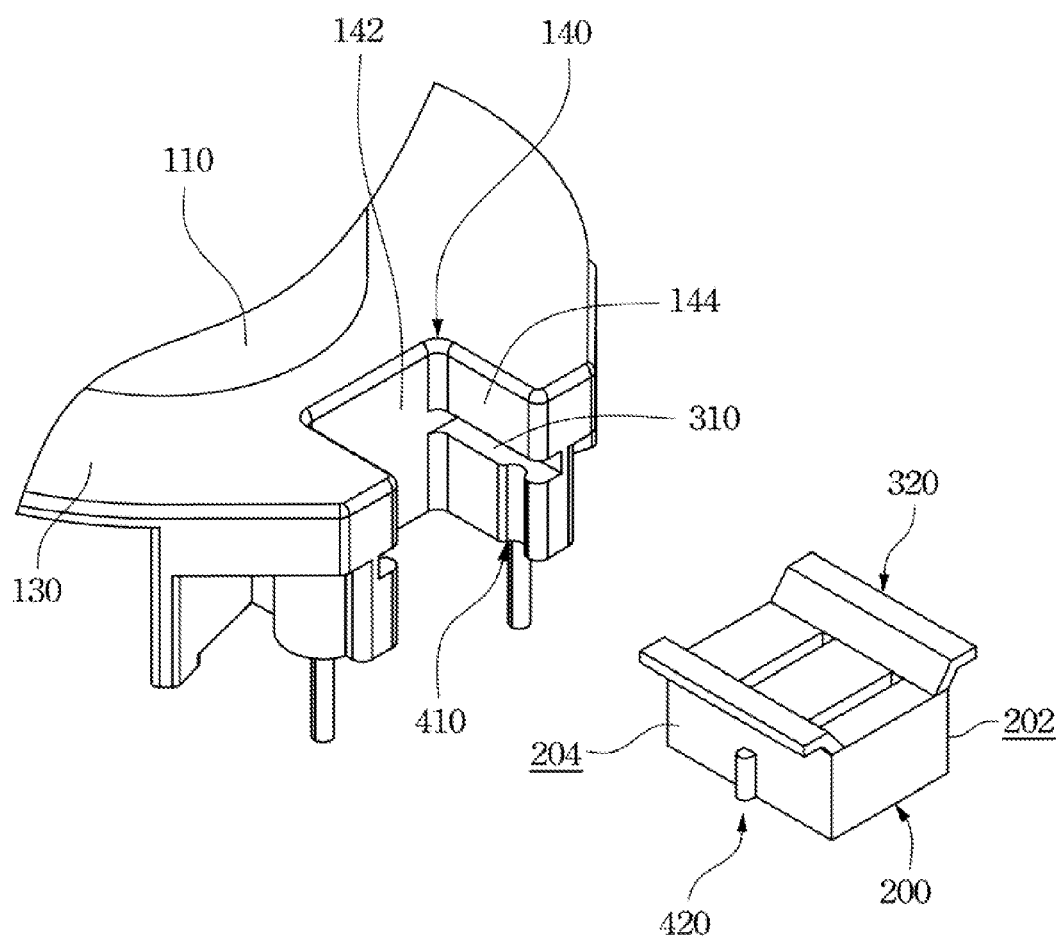
FIG. 2 is a partially perspective view of the bobbin of FIG. 1.

FIG. 2 is a partially perspective view of the bobbin of FIG. 1. As shown in this figure, the bobbin further includes at least one connecting structure 310 disposed in the containing cavity 140 for connecting the pin holder 200. Specifically, the connecting structure 310 is a skid rail, and the pin holder 200 includes at least one rib 320, in which the rib 320 is movably disposed in the connecting structure 310 (namely, the skid rail).

For example, the containing cavity 140 includes a back wall 142 and at least one lateral wall 144, and the lateral wall 144 is adjacent to the back wall 142. The connecting structure 310 is recessed on the lateral wall 144 of the containing cavity 140. The size and shape of the connecting structure 310 can be substantially identical as which of the rib 320 (e.g., the contacted surfaces of the connecting structure 310 and the rib 320 are both rectangular), so as to facilitate the rib 320 disposed in the connecting structure 310.

It should be noted that the term "substantially" means that any tiny variation or modification not affecting the essence of the technical feature can be included in the scope of the present disclosure. For example, the size and shape of the connecting structure 310 and the rib 320 being "substantially" identical not only includes the embodiment that the connecting structure 310 and the rib 320 are totally the same, but also includes the embodiment that the size and shape of the connecting structure 310 and the rib 320 are slightly different only if the rib 320 can slide on the connecting structure 310.

When assembling the pin holder 200 to the plate 130, the rib 320 can be inserted into the connecting structure 310 and can be slid towards the back wall 142 of the containing cavity 140 on the connecting structure 310, so as to facilitate the pin holder 200 to be disposed in the containing cavity 140. Contrarily, when disassembling the pin holder 200 from the plate 130, the rib 320 can be slid away from the back wall 142 of the containing cavity 140 on the connecting structure 310.

In some embodiments, the bobbin further includes a first fastening structure 410 and a second fastening structure 420. The first fastening structure 410 is disposed in the containing cavity 140. The second fastening structure 420 is disposed on the pin holder 200 for combining with the first fastening structure 410.

Specifically, the first fastening structure 410 is a groove and the second fastening structure 420 is a protruding rib. In this case, the second fastening structure 420 can be clamped in the first fastening structure 410, thereby fixing the pin holder 200 with the plate 130 and preventing the pin holder 200 from sliding.

It should be noted that the pin holder 200 may includes a first lateral surface 202 and a second lateral surface 204 opposite to the first lateral surface 202. In order to simplify the figure, the second fastening structure 420 is only depicted on the second lateral surface 204. It should be understood that another second fastening structure 420 may be formed on the first lateral surface 202, and it can be clamped by the first fastening structure 410 on the lateral wall 144 shown in FIG. 2.

For example, the first fastening structure 410 may be sunk on the lateral wall 144 of the containing cavity 140, and the second fastening structure 420 may be protruded on the surface of the pin holder 200 that faces the lateral wall 144 (i.e. the first lateral surface 202). The size and shape of the second fastening structure 420 and the first fastening structure 410 are substantially the same, so that they can be assembled more easily. For example, the first fastening structure 410 is an arc-shaped groove, and the second fastening structure 420 is an arc-shaped rib, in which curvature of the groove and curvature of the rib is identical, so that the second fastening structure 420 can be fixed in the first fastening structure 410 tightly.

Figure 3:
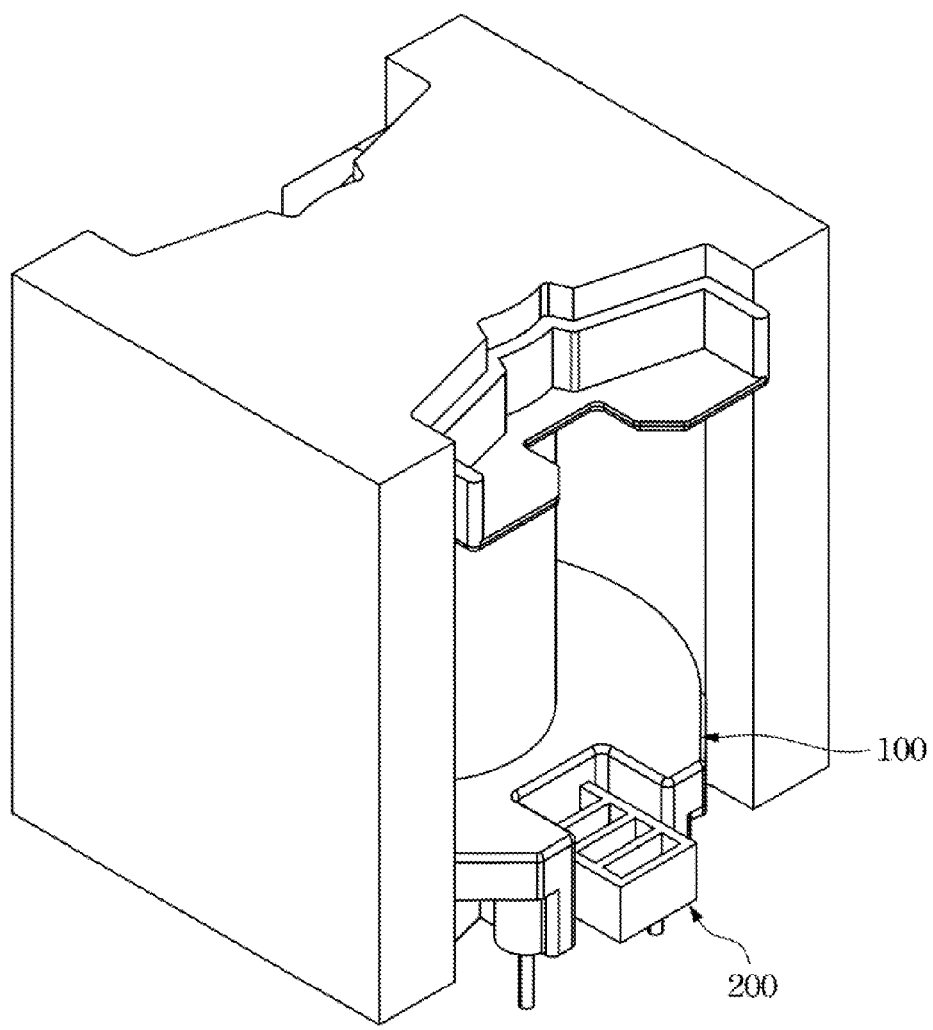
FIG. 3 is a perspective view of a bobbin in accordance with another embodiment of the present disclosure.

FIG. 3 is a perspective view of a bobbin in accordance with another embodiment of the present disclosure. As shown in the figure, this embodiment is similar to which is shown in FIG. 1, and the main difference is that the pin holder 200 and the body 100 are formed integrally in this embodiment.

Figure 4:
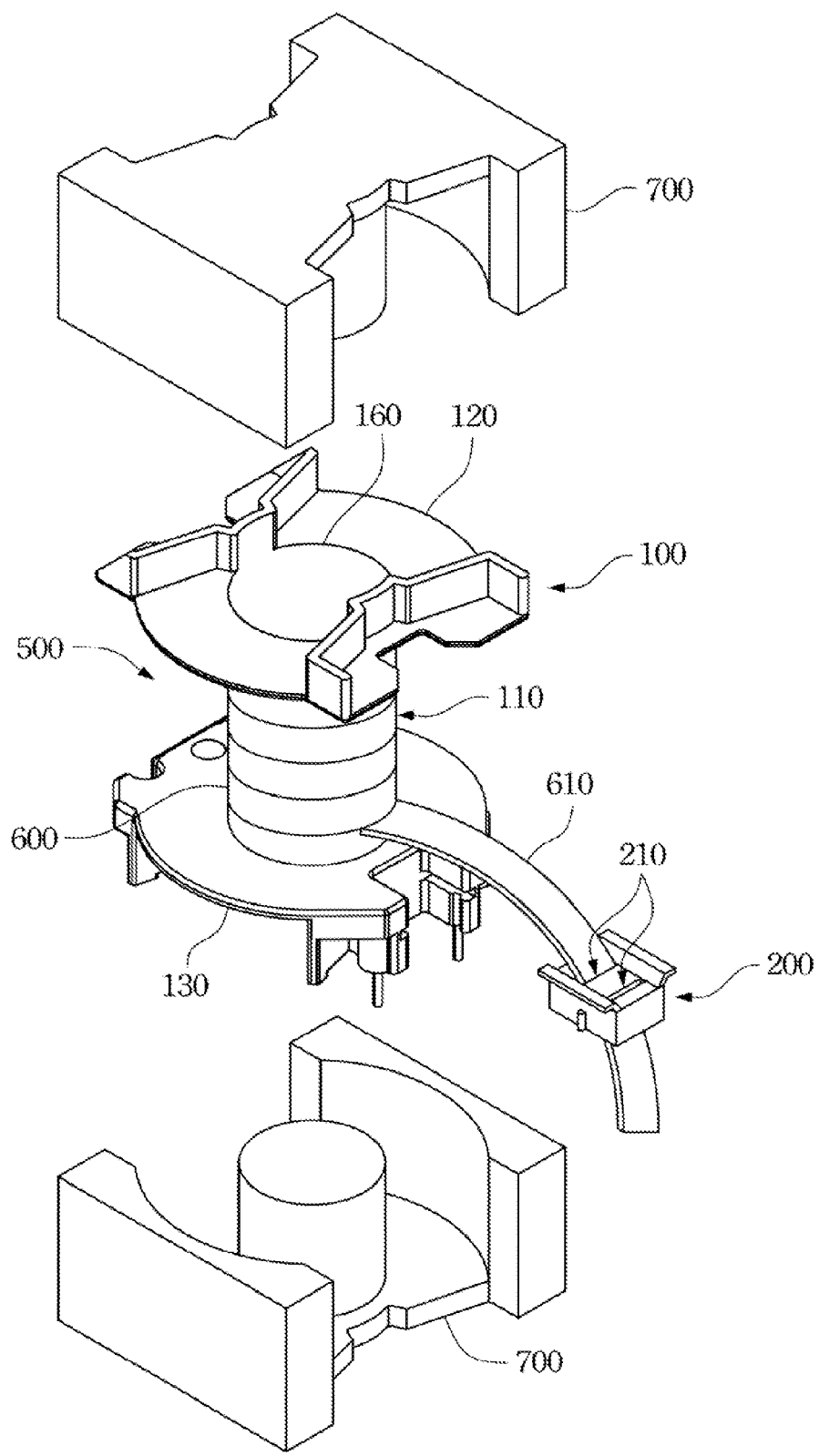
FIG. 4 is an explosive view of a magnetic component in accordance with one embodiment of the present disclosure.

FIG. 4 is an explosive view of a magnetic component in accordance with one embodiment of the present disclosure. As shown in this figure, the magnetic component includes a coil 600, a bobbin 500, and at least one core 700. The coil 600 has at least one pin 610. The bobbin 500 is similar to which shown in FIG. 1. Specifically, the bobbin 500 includes a body 100 and a pin holder 200. The body 100 includes a winding part 110 two plates 120 and 130, and a through passage 160. The coil 600 is winded on the winding part 110. The pin 610 is extended from the coil 600. The plates 120 and 130 are respectively disposed at opposite ends of the winding part 110. The core 700 partially inserts in the through passage 160. The pin holder 200 is disposed on one of the plates (i.e. the plate 130 in this embodiment), and it includes at least one locating hole 210, in which the pin 610 inserts in the locating hole 210.

In some embodiments, the size of the locating hole 210 is greater than which of the pin 610 so that the pin can pass through the locating hole 210. In this embodiment, the pin 610 is rectangular. In other embodiments, the pin 610 is circular, elliptic, or triangular.

In some embodiments, a plurality of coils 600 are winded on the winding part 110. Each coil 600 includes a plurality of pins 610. The pin holder 200 includes a plurality of locating holes 210, and these pins 610 can insert in the locating holes 210. According to the present disclosure, user can choose various pin holders 200 with different quantities and shape of the locating holes 210 depending on the quantities and shape of the pin 610.

Figure 5A:
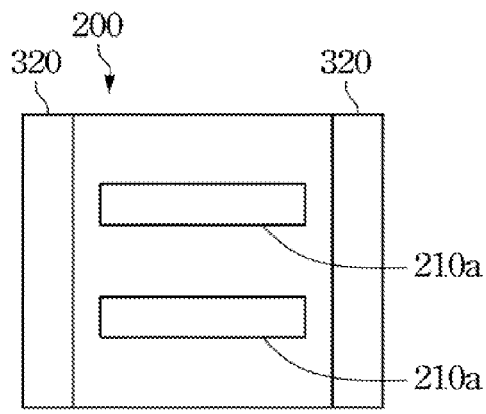
FIG. 5A is a top view of the pin holder 200 in accordance with one embodiment of the present disclosure.

FIG. 5A is a top view of the pin holder 200 in accordance with one embodiment of the present disclosure. As shown in this figure, the pin holder includes two locating holes 210a, and these locating holes 210a is rectangular for inserting two rectangular pins 610. For example, those rectangular pins 610 are copper foils.

Figure 5B:
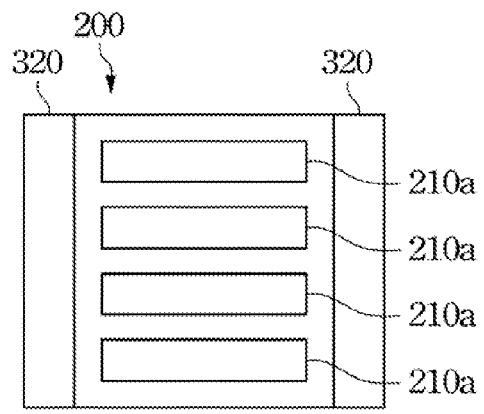
FIG. 5B is a top view of the pin holder 200 in accordance with another embodiment of the present disclosure.

FIG. 5B is a top view of the pin holder 200 in accordance with another embodiment of the present disclosure. This embodiment is similar to FIG. 5A, and the main difference is that the pin holder 200 of this embodiment includes four locating holes 210a for inserting four rectangular pins.

Figure 6A:
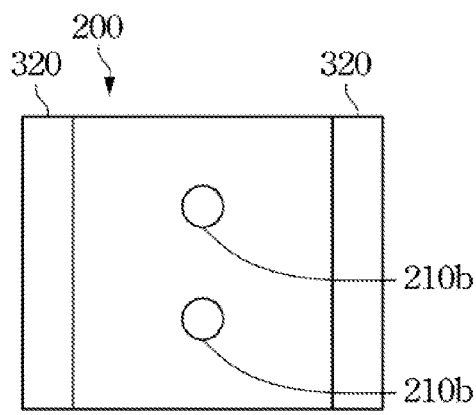
FIG. 6A is a top view of the pin holder in accordance with another embodiment of the present disclosure.

FIG. 6A is a top view of the pin holder in accordance with another embodiment of the present disclosure. This embodiment is similar to FIG. 5A, and the main difference is that the pin holder 200 of this embodiment includes two locating holes 210b, and these locating holes 210b are circular or elliptic for inserting two circular or elliptic pins 610. For example, the circular pin 610 is a wire with circular cross-sectional area.

Figure 6B:
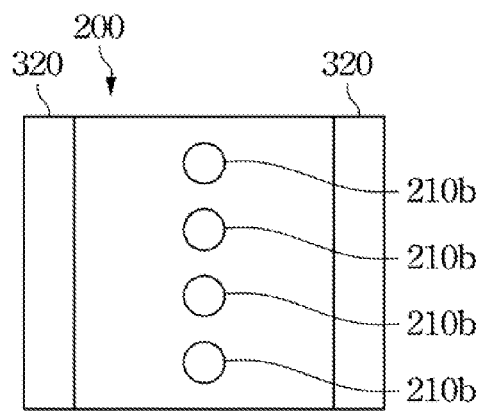
FIG. 6B is a top view of the pin holder 200 in accordance with another embodiment of the present disclosure.

FIG. 6B is a top view of the pin holder 200 in accordance with another embodiment of the present disclosure. This embodiment is similar to FIG. 5B, and the main difference is that the pin holder 200 of this embodiment includes four locating holes 210b, and these locating holes 210b are circular or elliptic for inserting four circular or elliptic pins 610.

Figure 7A:
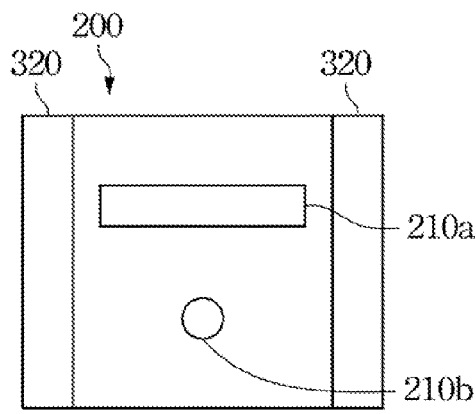
FIG. 7A is a top view of the pin holder 200 in accordance with another embodiment of the present disclosure.

FIG. 7A is a top view of the pin holder 200 in accordance with another embodiment of the present disclosure. This embodiment is similar to FIG. 6A, and the main difference is that the pin holder 200 of this embodiment includes a locating hole 210a and a locating hole 210b. The locating hole 210a is rectangular, and the locating hole 210b is circular or elliptic, so as to insert a rectangular pin and a circular or elliptic pin.

Figure 7B:
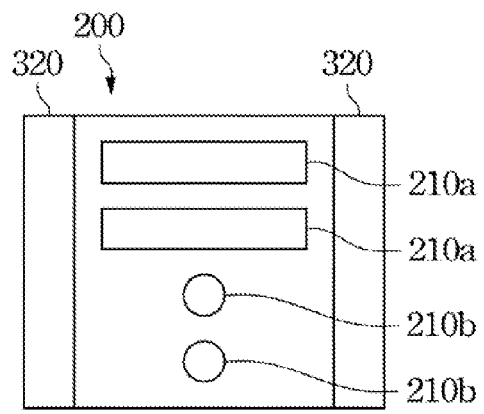
FIG. 7B is a top view of the pin holder 200 in accordance with another embodiment of the present disclosure.

FIG. 7B is a top view of the pin holder 200 in accordance with another embodiment of the present disclosure. This embodiment is similar to FIG. 6B, and the main difference is that the pin holder 200 of this embodiment includes two locating holes 210a and two locating holes 210b. The locating holes 210a are rectangular, and the locating holes 210b are circular or elliptic, so as to insert two rectangular pins and two circular or elliptic pins.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A bobbin, applicable to a magnetic component comprising at least one coil having at least one pin, comprising:
   a body comprising:
      a winding part for winding the coil; and
      two plates respectively disposed at opposite ends of the winding part; and
   a pin holder disposed on one of the plates, and comprising at least one locating hole for inserting the pin, wherein the locating holes are rectangular holes, circular holes, or combinations of the rectangular holes and the circular holes;
   wherein the one of the plates on which the pin holder is disposed comprises a containing cavity, and a part of the pin holder is disposed in the containing cavity;
   wherein the containing cavity comprises a back wall, at least one lateral wall and an outer wall, wherein the back wall faces away from a long axis of the winding part, and the lateral wall is connected between the back wall and the outer wall;
   wherein the bobbin further comprises at least one skid rail and a first fastening structure disposed in the containing cavity, wherein the skid rail and the first fastening structure are shaped as grooves that are formed in the lateral wall, the first fastening structure and the skid rail have lengthwise directions substantially perpendicular to each other, wherein the skid rail connects the back wall and the outer wall, and the first fastening structure is spaced apart from the outer wall;
   wherein the pin holder comprises at least one rib which movably disposed in the skid rail; and
   wherein the bobbin further comprises a second fastening structure disposed on the pin holder, the second fastening structure is elastically compressed by the lateral wall and then rebounded into the first fastening structure when the rib moves along the skid rail toward the back wall, thereby achieving a snap-fitting connection between the first fastening structure and the second fastening structure.

2. The bobbin of claim 1, wherein the second fastening structure is a protruding rib.

3. The bobbin of claim 1, wherein the quantities of the locating holes are even.

4. A magnetic component comprising:
   a coil having at least one pin;
   a bobbin comprising:
   a body comprising:
      a winding part for winding the coil;
      two plates respectively disposed at opposite ends of the winding part; and
      a through passage; and
   a pin holder detachably disposed on one of the plates, and comprising at least one locating hole for inserting the pin, wherein the locating holes are rectangular holes, circular holes, or combinations of the rectangular holes and the circular holes; and
   at least one core partially inserted in the through passage;
   wherein the one of the plates on which the pin holder is disposed comprises a containing cavity, and a part of the pin holder is disposed in the containing cavity;
   wherein the containing cavity comprises a back wall, at least one lateral wall and an outer wall, wherein the back wall faces away from a long axis of the winding part, and the lateral wall is connected between the back wall and the outer wall;
   wherein the bobbin further comprises at least one skid rail and a first fastening structure disposed in the containing cavity, wherein the skid rail and the first fastening structure are shaped as grooves that are formed in the lateral wall, the first fastening structure and the skid rail have lengthwise directions substantially perpendicular to each other, wherein the skid rail connects the back wall and the outer wall, and the first fastening structure is spaced apart from the outer wall;
   wherein the pin holder comprises at least one rib which is movably disposed in the skid rail; and
   wherein the bobbin further comprises a second fastening structure disposed on the pin holder, the second fastening structure is elastically compressed by the lateral wall and then rebounded into the first fastening structure when the rib moves along the skid rail toward the back wall, thereby achieving a snap-fitting connection between the first fastening structure and the second fastening structure.

5. The magnetic component of claim 4, wherein the second fastening structure is a protruding rib.

6. The magnetic component of claim 4, wherein the quantities of the locating holes are even.

7. A bobbin, applicable to a magnetic component comprising at least one coil having at least one pin, comprising:
   a body comprising:
      a winding part for winding the coil; and
      two plates respectively disposed at opposite ends of the winding part; and
   a pin holder disposed on one of the plates, and comprising at least one locating hole for inserting the pin;
   wherein the one of the plates on which the pin holder is disposed comprises a containing cavity, and a part of the pin holder is disposed in the containing cavity;
   wherein the winding part has a long axis about which the coil is wound, the one of the plates on which the pin holder is disposed has an inner surface and an outer surface opposite to each other along a direction of the long axis of the winding part, the one of the plates on which the pin holder is disposed has an outer circumferential wall surface between the inner surface and the outer surface, and the containing cavity is formed in a notched configuration extending inwardly from the outer circumferential wall surface toward the winding part and passed through the inner surface and the outer surface;
   wherein the containing cavity includes three walls, one of the walls facing away from the long axis of the winding part of the body, and two of the walls facing each other;

wherein the bobbin further comprises at least one connecting structure disposed in the containing cavity for connecting the pin holder, the at least one of the connecting structure is a skid rail shaped as a groove that is formed in at least one of the two walls of the containing cavity facing each other and that extends from the outer circumferential wall surface of the one of the plates on which the pin holder is disposed toward the winding part in a direction substantially perpendicular to the direction of the long axis of the winding part; and wherein the pin holder comprises at least one rib which is movably disposed in the at least one of the connecting structure;

wherein the bobbin further comprises a first fastening structure and a second fastening structure, the first fastening structure is disposed in the containing cavity and is shaped as a groove, the skid rail and the first fastening structure have lengthwise directions substantially perpendicular to each other, the second fastening structure is disposed on the pin holder; and wherein the second fastening structure is elastically compressed by the one of the two walls of the containing cavity facing each other and then rebounded into the first fastening structure when the rib moves along the skid rail toward the long axis of the winding part of the body, thereby achieving a snap-fitting connection between the first fastening structure and the second fastening structure.

8. A magnetic component comprising:
a coil having at least one pin;
a bobbin comprising:
a body comprising:
 a winding part for winding the coil;
 two plates respectively disposed at opposite ends of the winding part; and
 a through passage; and
a pin holder disposed on one of the plates, and comprising at least one locating hole for inserting the pin; and
at least one core partially inserted in the through passage;
wherein the one of the plates on which the pin holder is disposed comprises a containing cavity, and a part of the pin holder is disposed in the containing cavity;
wherein the winding part has a long axis about which the coil is wound, the one of the plates on which the pin holder is disposed has an inner surface and an outer surface opposite to each other along a direction of the long axis of the winding part, the one of the plates on which the pin holder is disposed has an outer circumferential wall surface between the inner surface and the outer surface, and the containing cavity is formed in a notched configuration extending inwardly from the outer circumferential wall surface toward the winding part and passed through the inner surface and the outer surface;

wherein the containing cavity includes three walls, one of the walls facing away from the long axis of the winding part of the body, and two of the walls facing each other;

wherein the bobbin further comprises at least one connecting structure disposed in the containing cavity for connecting the pin holder, the at least one of the connecting structure is a skid rail shaped as a groove that is formed in at least one of the two walls of the containing cavity facing each other and that extends from the outer circumferential wall surface of the one of the plates on which the pin holder is disposed toward the winding part in a direction substantially perpendicular to the direction of the long axis of the winding part; and wherein the pin holder comprises at least one rib which is movably disposed in the at least one of the connecting structure;

wherein the bobbin further comprises a first fastening structure and a second fastening structure, the first fastening structure is disposed in the containing cavity and is shaped as a grove, the skid rail and the first fastening structure have lengthwise directions substantially perpendicular to each other, the second fastening structure is disposed on the pin holder; and wherein the second fastening structure is elastically compressed by one of the two walls of the containing cavity facing each other and then rebounded into the first fastening structure when the rib moves along the skid rail toward the long axis of the winding part of the body, thereby achieving a snap-fitting connection between the first fastening structure and the second fastening structure.

* * * * *